June 7, 1932.  I. SHORT  1,862,512

REDUCTION GEAR CASING

Filed Aug. 1, 1931  6 Sheets-Sheet 1

INVENTOR
IRA SHORT.
A. B. Reavis
ATTORNEY

June 7, 1932.  I. SHORT  1,862,512

REDUCTION GEAR CASING

Filed Aug. 1, 1931  6 Sheets-Sheet 2

INVENTOR
IRA SHORT.
ATTORNEY

INVENTOR
IRA SHORT.
A. B. Ravis
ATTORNEY

June 7, 1932.　　　　　I. SHORT　　　　　1,862,512

REDUCTION GEAR CASING

Filed Aug. 1, 1931　　　6 Sheets-Sheet 4

INVENTOR
IRA SHORT.
R. B. Reavis
ATTORNEY

June 7, 1932. I. SHORT 1,862,512
REDUCTION GEAR CASING
Filed Aug. 1, 1931 6 Sheets-Sheet 5

INVENTOR
IRA SHORT.
BY A. P. Rivers
ATTORNEY

June 7, 1932.　　　I. SHORT　　　1,862,512
REDUCTION GEAR CASING
Filed Aug. 1, 1931　　6 Sheets-Sheet 6
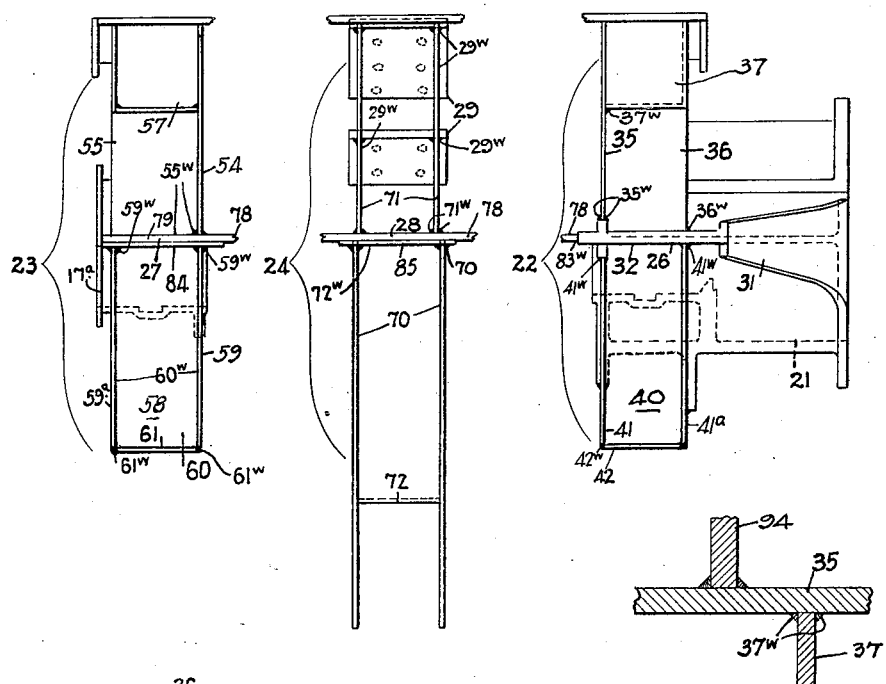
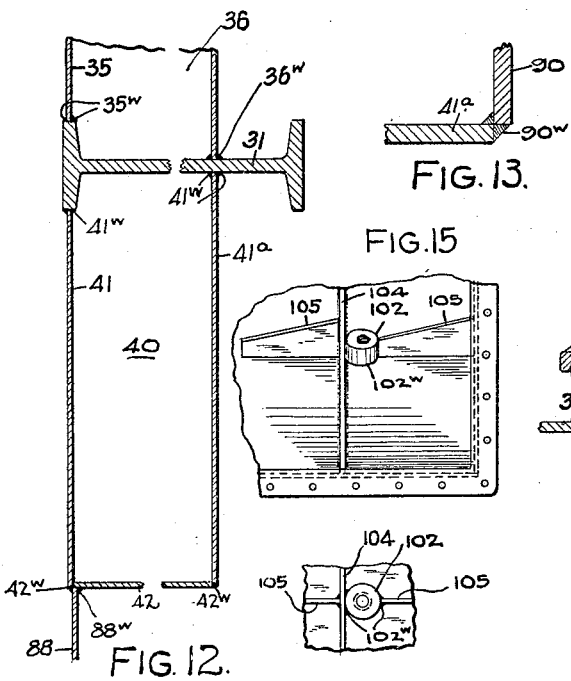
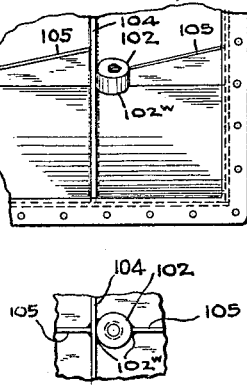
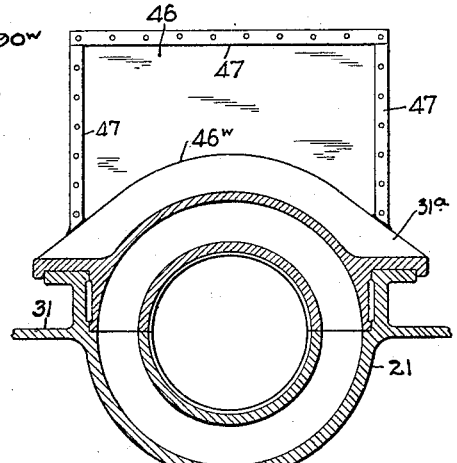

Patented June 7, 1932

1,862,512

UNITED STATES PATENT OFFICE

IRA SHORT, OF ESSINGTON, PENNSYLVANIA, ASSIGNOR TO WESTINGHOUSE ELECTRIC & MANUFACTURING COMPANY, A CORPORATION OF PENNSYLVANIA

REDUCTION GEAR CASING

Application filed August 1, 1931. Serial No. 554,483.

My invention relates to reduction gearing, more particularly of the marine type, and it has for an object to provide a fabricated housing construction made up of welded plate material to provide a relatively light, high-powered gear.

A further object of my invention is to provide a cross member forming a part of the reduction gear housing and supporting construction and carrying the propeller thrust bearing and having its ends connected directly to ship's structure so that propeller thrust is transmitted directly from the driven gear spindle to the ship's structure, instead of through the casing or housing for the gearing and thence to the ship's structure.

A further object of my invention is to provide a gear casing and supporting construction consisting essentially of end beams or girders carrying the bearings for the driven gear and an intermediate, U-shaped, beam or girder for supporting the pinions meshing with the driven gear, the beams or girders having feet or brackets formed at the ends thereof for attachment to ship's structure and the beams or girders being constructed and arranged to withstand load stresses.

A further object of my invention is to provide a reduction gear having its housing provided with an intermediate U-shaped beam or girder for supporting the pinion or pinions, the U-shaped beam or girder resisting spreading of the pinions away from the driven gear.

A further object of my invention is to provide a reduction gear having its housing including end beams or girders carrying the bearings for the driven gear and cut away above the bearings to provide spaces permitting of assembly and removal of the driven gear, any weakness in compression brought about by the cut-away spaces being taken care of by the gear housing cover which is securely bolted to the upper edges of the end beams or girders and, therefore, acts as a compression element of each end beam or girder.

A further object of my invention is to provide a reduction gear having a housing including lower and upper parts, with the pinion and gear members and the floating frame for the pinion carried by the lower part and with the strut means for the floating frame carried by the upper part, thereby providing tension connections between the pinion and the driven gear resisting spreading of the pinion away from the driven gear.

These and other objects are effected by my invention, as will be apparent from the following description and claims, taken in connection with the accompanying drawings, forming a part of this application, in which:

Fig. 11 is a fragmentary detail view showing the supporting beam or girder constructions;

Fig. 12 is a detail fragmentary sectional view taken along the line XII—XII of Fig. 2;

Fig. 13 is a detail view showing a welded connection where plates are joined at their edges at right angles and taken along line XIII—XIII of Fig. 2;

Fig. 14 is a detail view showing another type of welded connection taken along line XIV—XIV of Fig. 2;

Figs. 15 and 16 are detail views showing the strut support; and,

Fig. 17 is a detail sectional view of the cross member or yoke showing the bearing housing and taken along line XVII—XVII of Fig. 7.

Figure 1:
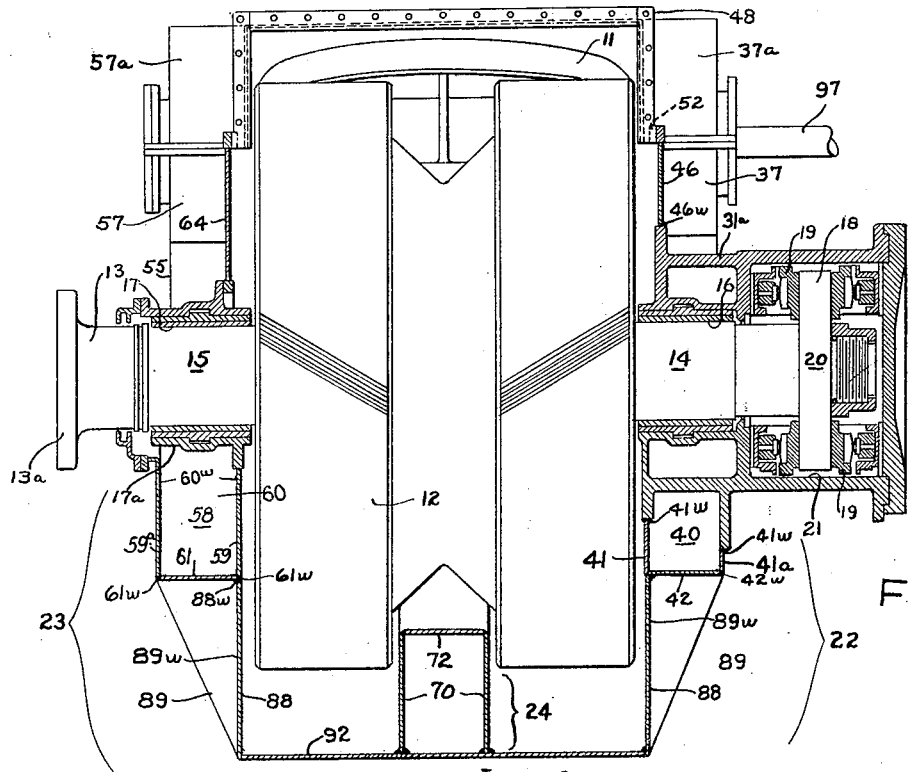
Fig. 1 is a sectional view taken along the line I—I of Fig. 2.

In accordance with my invention, I provide a reduction gear wherein the driven gear is supported by end beam or girder constructions and pinions mesh with the driven gear and preferably have their axes arranged at a higher elevation than the axis of the driven gear. The end beam or girder constructions are provided with U-shaped spaces to permit of the assembly of the driven gear and its bearings, and any weakness, which might otherwise exist on account of these spaces, is taken care of by the casing cover or upper part, the latter functioning as stress elements bridging the spaces and connected to the upper edges of the end beam or girder constructions. The pinions are preferably carried by floating frames, and the latter are connected to termini of an intermediate U-shaped beam or girder construction, which is very stiff and strong and will, therefore, resist spreading of the pinions away from the driven gear. Aside from the strength of the U-shaped beam or girder construction in the latter connection, the cover also functions to resist the spreading action; and, to this end, the floating frames are backed up by struts carried by the cover so that the cover and the end beam or girder constructions constitute tension structure resisting movement of the pinion away from the driven gear. The end beam or girder constructions and the intermediate U-shaped beam or girder construction are formed with feet for attachment to suitable ship's or supporting structure. The gearing includes a relatively strong steel cross member or yoke, which is not only provided with one of the bearings for the driven gear but also with the propeller thrust bearings, and the ends of this relatively strong cast steel cross member or yoke provide supporting feet or brackets for one end of the gear. The cross member or yoke is so shaped and constructed that it functions as a beam stiff horizontally to resist propeller thrust, and it preferably constitutes a part of one of the end beam or girder constructions, the cross member or yoke cooperating with other structure to provide the requisite vertical stiffness and strength for carrying one of the driven gear journals. The cross member or yoke preferably has the terminal supporting surfaces thereof, which directly engage with the ship's structure, arranged in, or substantially in, the horizontal plane of the axis of the driven gear and thrust bearing, whereby the moment arm of the force of propulsion thrust and tending to tilt the cross member is reduced to zero or nearly so. It will, therefore, be seen that I have taken care of all load stresses by an advantageous arrangement of suitable material: the girder constructions support the driven gear and pinion or pinions; each pinion is maintained in proper meshing relation by either or both the supporting intermediate girder construction or by strut means carried by the cover which is fastened to the lower part of the housing; and a cross member or yoke is provided to relieve the gear housing of propeller thrust, the latter being transmitted directly from the cross member or yoke to ship's structure.

Referring now to the drawings more in detail, I show pinions 10 carried by the floating frames 11 and meshing with the driven gear 12 carried by the spindle 13, the latter having journal portions 14 and 15 fitting journal bearings 16 and 17, respectively. In accordance with standard practice, the pinions and the driven gear each have axially-spaced, oppositely-inclined-helical tooth portions. The aft end of the spindle has a coupling portion 13a arranged to be connected directly to the propeller shaft, and, at the forward end, the spindle is provided with a thrust collar 18 having thrust shoes 19 cooperating with opposite sides thereof to constitute the thrust bearing, at 20, arranged in the housing 21.

The casing or housing supports the driven gear 12 and the pinions 10, and it preferably consists of fabricated end beam or girder structures, at 22 and 23, and a fabricated intermediate U-shaped beam or girder structure, at 24. The forward and aft end beam or girder structures, at 22 and 23, support the journal bearings 16 and 17, respectively, for the driven gear; and the intermediate U-shaped beam or girder structure, at 24, carries the floating frames 11 of the pinions 10. Suitable plating and a cover cooperate with the beam or girder structures to hold the latter in proper relation and to form an enclosure for the gearing.

Figure 2:
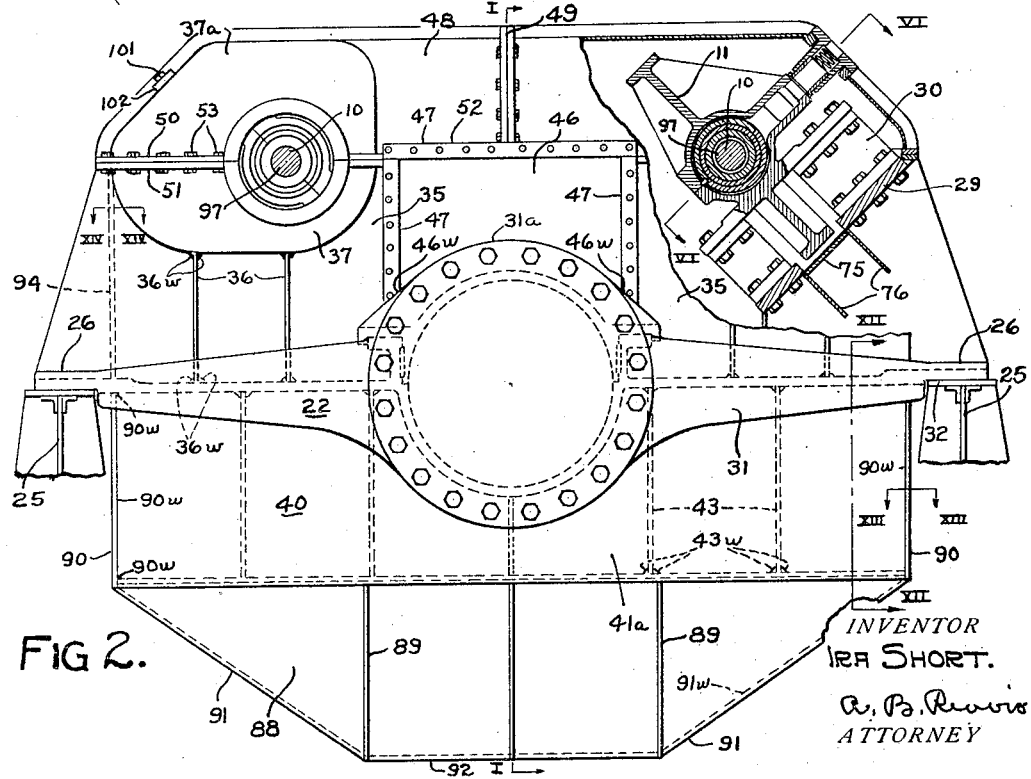
Fig. 2 is an end elevation viewed from the thrust bearing and forward end of the reduction gear and shown partly in section.
Figure 3:
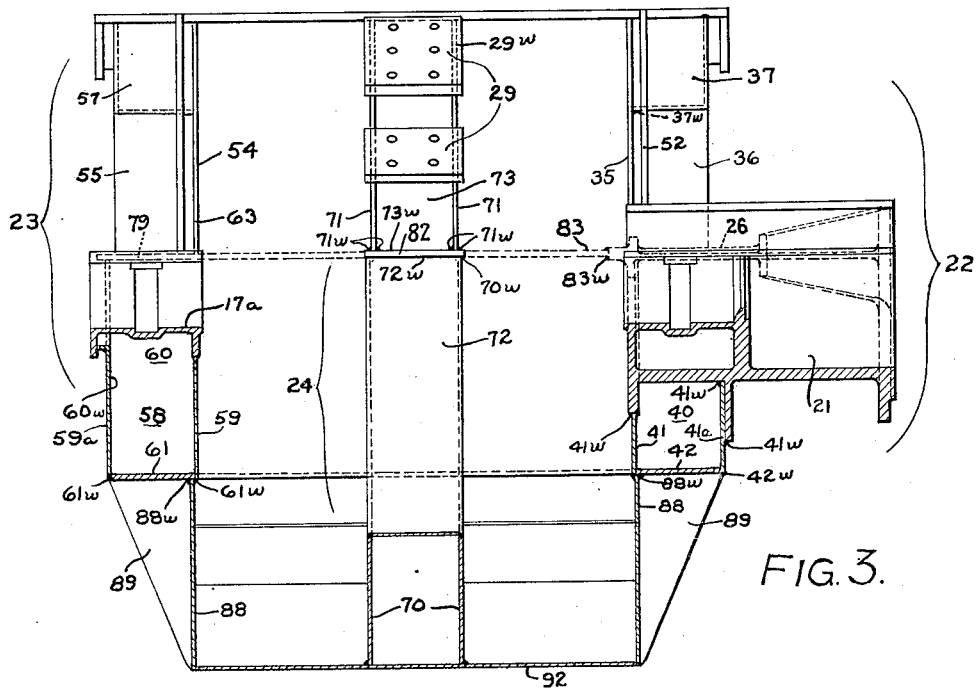
Fig. 3 is a sectional view taken along the line III—III of Fig. 4.
Figure 5:
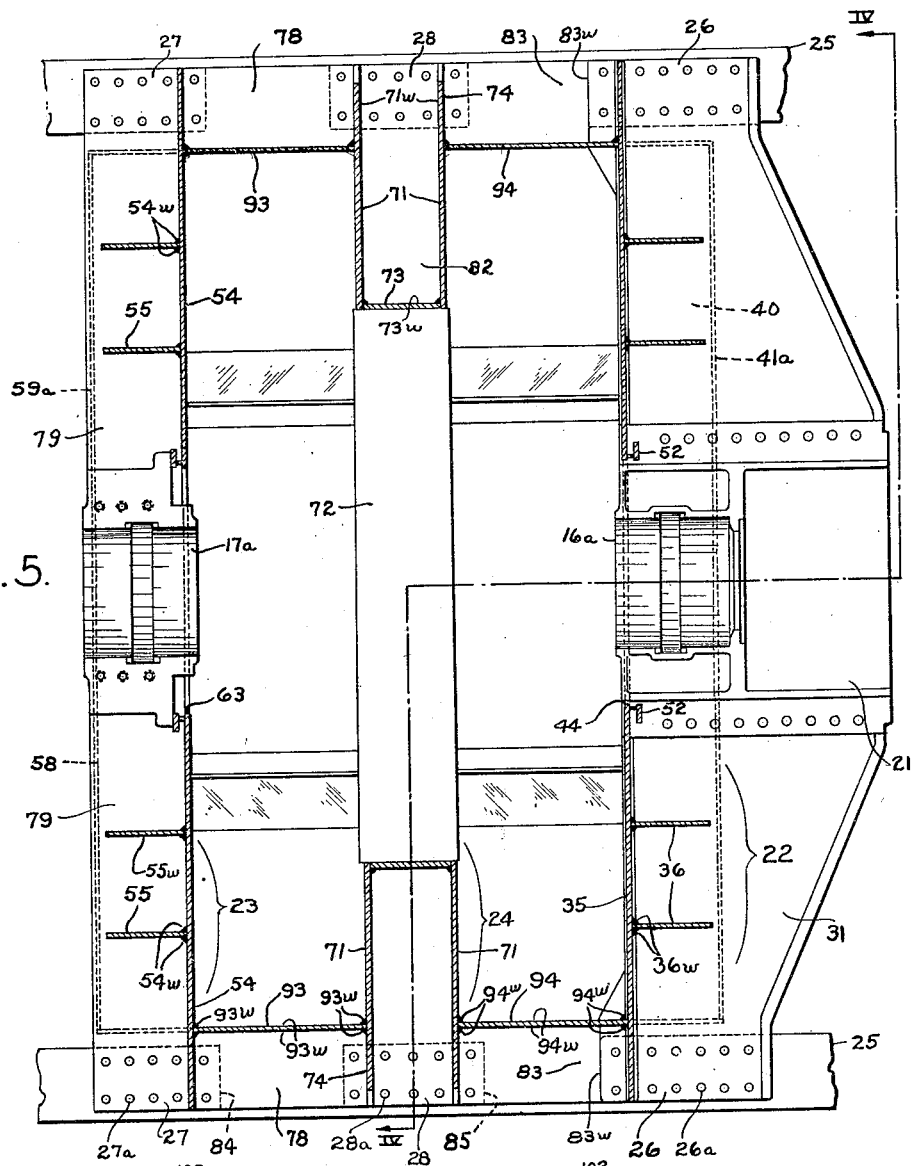
Fig. 5 is a sectional view taken along the line V—V of Fig. 4.

As shown in Fig. 2, suitable ship's structure, such as built-up beam or column structures 25, are arranged parallel to the driven gear axis and at the sides of the gear housing. The forward beam or girder structure, at 22, is provided with feet or brackets 26 supported on the ship's structures 25; the aft beam or girder structure, at 23, has supporting feet or brackets 27 resting on structures 25; and the intermediate U-shaped beam or girder structure, at 24, has brackets or feet 28 resting on the ship's structure. As shown in Fig. 5, each of the brackets 26, 27, and 28 are securely bolted down, by means of bolts 26a, 27a, and 28a to the ship's structures 25.

The forward beam or girder structure, at 22, not only carries the forward journal bearings 16, but it is also modified to provide the housing 21 for the propeller thrust bearing 20, so that the propeller thrust is transmitted directly through structure of the forward end beam or girder structure, at 22, to the ship's structure. The U-shaped beam or girder structure is provided with pads 29 to which flexible supports 30 are connected, the latter also being connected to the floating frame 11 (see Fig. 2).

Support of the forward journal bearing 16 and of the propeller thrust bearing 20 is provided for by a yoke or girder member 31 and having its ends forming parts of the brackets 26. The cross member or casting 31 is relatively stiff and strong horizontally so as to transmit propeller stress directly from the driven gear spindle 13 to the ship's structure with a minimum of deflection horizontally; and, to this end, it will be noted that the material of the cross member is advantageously disposed to serve this purpose, that is, it is formed as a beam or girder effective horizontally. Not only is the beam or cross member 31 constructed and arranged to transmit propeller thrust directly to ship's structure without such thrust going through the gear casing proper, but such beam or cross member is connected to other parts forming the end beam or girder construction, at 22, which is adequately stiff and strong vertically to support the forward end of the gear spindle. The supporting surfaces 32 of the brackets 26 are arranged in, or substantially in, the longitudinal axis of the thrust bearing so that there is no moment due to the force of propeller thrust and effective to tilt the cross member 31 about a transverse axis.

Figure 6:
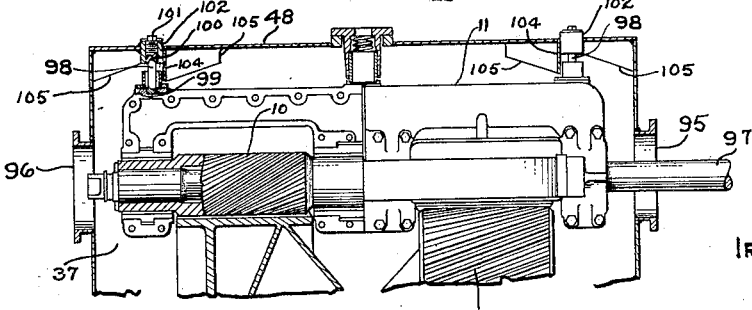
Fig. 6 is a sectional view taken along the line VI—VI of Fig. 2 looking in the direction of the arrows.
Figure 7:
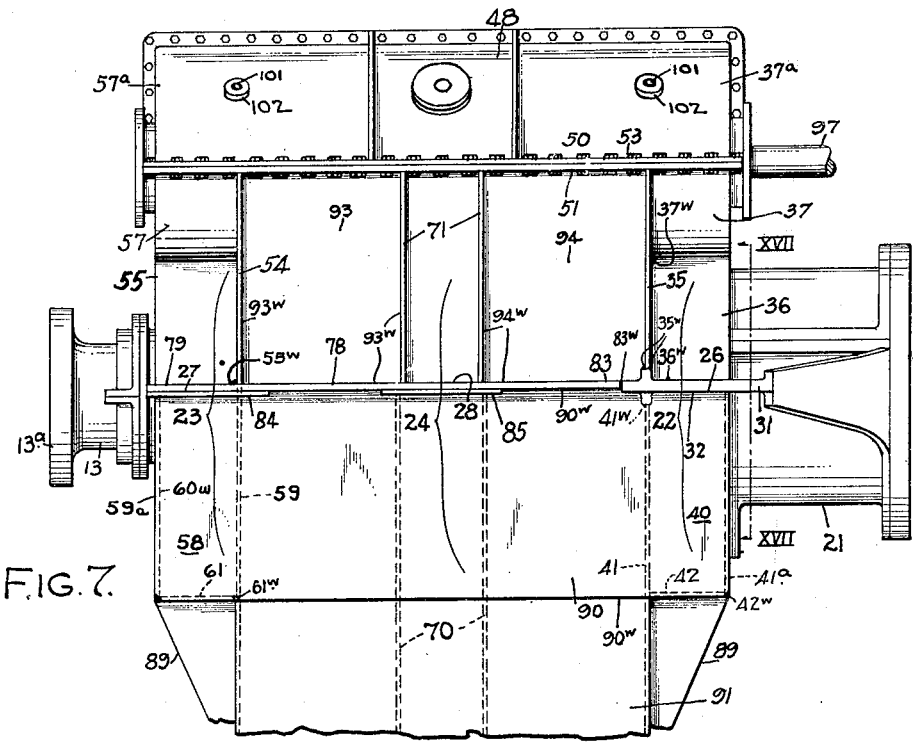
Fig. 7 is a side elevational view of apparatus shown in Fig. 2.
Figure 8:
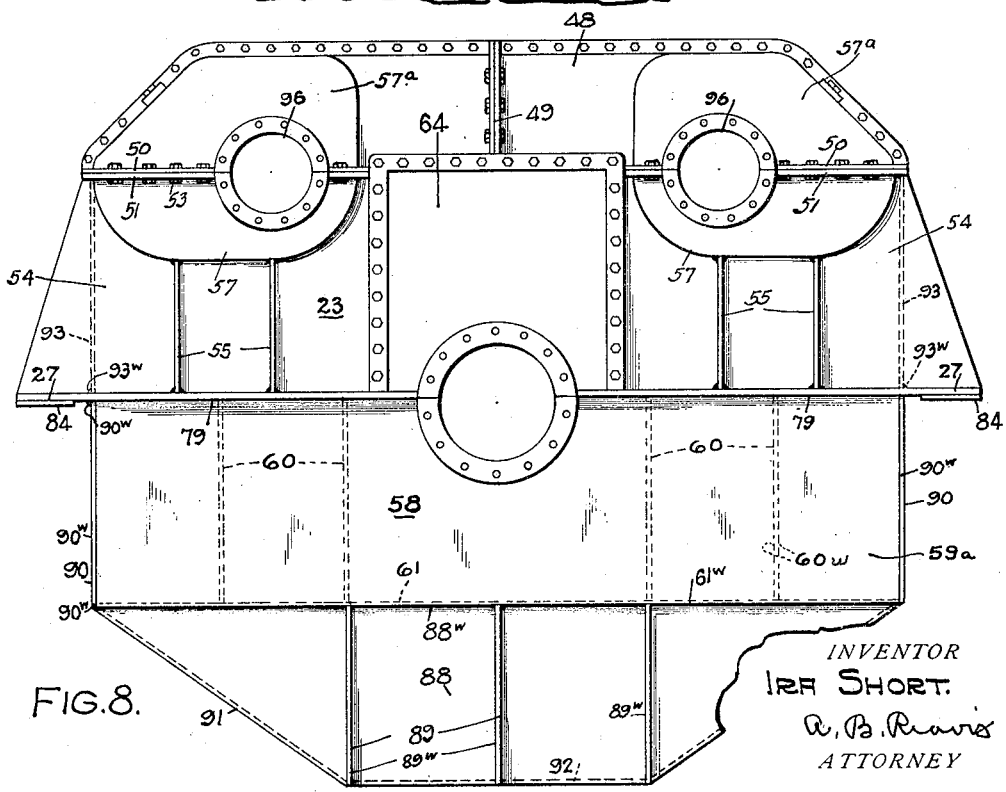
Fig. 8 is an aft and elevational view of the apparatus shown in Fig. 2.

In addition to the cast steel cross member or yoke 31, the forward end beam or girder construction, at 22, includes upper plates 35 welded at 35w to the upper surface of the cross member 31 and stiffened by vertical plates 36, also welded to the cross member 31 and to the plates 35 at 36w. Each plate 35 is cut away, like the vertical plates 54 at 56 of the aft beam structure 23 (Fig. 4), to provide clearance for the forward ends of the floating frames, and housings 37 are welded at 37w to the plates 35 and to the upper ends of the stiffening plates 36 at 36w to constitute enclosures for the ends of the floating frame (Fig. 6).

A box girder 40 is connected to the lower side of the cross beam 31, such girder being made up of inner and outer vertical cross plates 41 and 41a having their upper edges welded at 41w to the lower surface of the cross beam or girder and having their lower edges welded to opposite side edges of the cross plate 42 at 42w, the box girder being stiffened by vertical plates 43 welded at 43w to the cast cross member 31 and to the plates 41, 41a, and 42.

The upper plates 35 are spaced apart to provide a U-shaped space 44 permitting of the assembly and dismantling of the driven gear and of its forward bearing 16 with respect thereto. A door 46 is welded at 46w to the top of the cover 31a for the journal bearing 16 and the thrust bearing 20 and it is bolted at opposite sides, by the bolting strips 47, to the plates 35. As may be seen from Fig. 2, compressive strength of the upper portion of the girder or beam structure, at 22, is provided for by the gear cover 48 and the door 46. The cover 48 is preferably made in two parts connected at 49 and the cover has a flange 50 mating with a flange 51 provided at the upper side of the end beam or girder structure, at 22, the mating flanges 50 and 51 being bolted together by bolts 53, whereby the cover serves as a compression element bridging the space between the plates 35. Also, the door is provided with a bolting strip 47 at the top for bolting it to the cover 48. The plates 35 preferably have connected thereto bolting strips 52 to which the door side strips 47 are bolted.

The aft cross member or girder structure, at 23, is somewhat similar to the forward structure, at 22. It consists of vertical upper plates 54 and stiffeners 55, preferably welded thereto at 54w (Fig. 5) and to the structure hereinafter referred to. The vertical plates 54 are cut away, as shown at 56 in Fig. 4, to provide clearance to the aft ends of the floating frame structures. Outwardly of the plates 54 and welded thereto, similarly to the forward housings 37 are disposed aft floating frame housings 57. The lower portion of the girder structure, at 23, is constituted by a lower box girder 58 made up of inner and outer vertical plates 59 and 59a, vertical stiffening plates 60 and a horizontal bottom plate 61, the plates 60 and 61 being welded at 60w and 61w to the vertical plates 59 and 59a. The upper vertical plates 54 are spaced apart to form the U-shaped space 63, and the vertical plates 58 and 59 of the lower box girder are formed to provide a seat for the lower half 17a of the bearing 17. The U-shaped space 63, above the bearing, is covered by a door 64, the latter being connected to the gear case cover 48 and to the plates 54 in a manner similar to the door 46 already referred to. As with the forward beam or girder structure, strength in compression at the upper portion of the aft beam or girder structure, at 23, is provided for by the cover 48.

The intermediate girder construction 24 for supporting the floating frame 11 is made up of U-shaped vertical side plates 70 and 71 and inner curved plates 72 and 73, the plates 70 and 71 and 72 and 73 being connected together to form a unitary structure in the manner hereinafter pointed out. The terminal portions of the vertical plates 71 are inclined and have welded thereto at 29w (Fig. 11) the pads 29 to which the floating frame connections 30 are connected, and such upper plate portions 71 extend outwardly, as shown at 74 in Fig. 4, to constitute portions of the feet or bracket structures 28 for supporting the U-shaped girder structure. The plates 71 are stiffened to form sturdy floating frame supports both by the plate 73 and by the stiffening plates 75 and 76, preferably welded to the plates 71 and to the pads 29.

Figure 9:
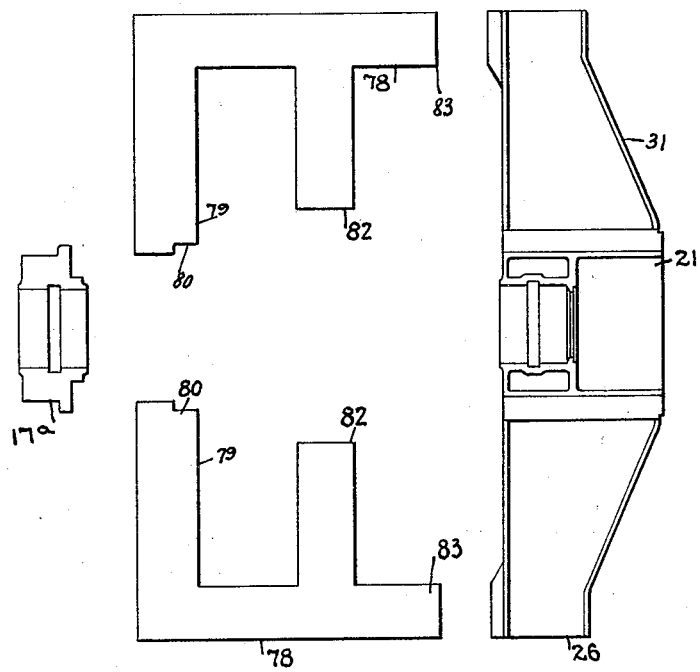
Fig. 9 is an exploded detail view showing the relation of the parts in Fig. 2.
Figure 10:
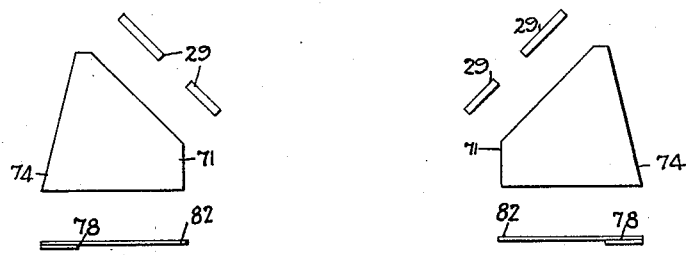
Fig. 10 is an exploded detail view showing the relation of certain of the parts forming the U-shaped girder or beam for carrying the pinions.
Figure 10:
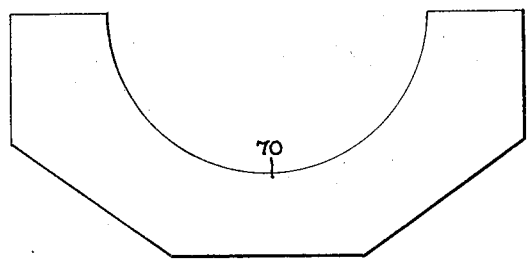

While the upper vertical plates 54 of the aft girder structure, at 23, and the upper vertical plates 71 and 73 of the intermediate U-shaped girder structure serve functionally as integral parts of the respective girder structures, nevertheless, such plates are shown as physically separate from the lower plates 57, 70 and 72, the upper and lower plates being separated by F-shaped plate members 78 (Fig. 9). The F-shaped members serve the purpose of spacing the girder structures in proper relation, stiffening the casing structure, and of providing supporting feet for the terminal portions of the aft and intermediate girder structures. Each horizontal F-shaped plate 78 has an inwardly-extending arm 79 which is welded at 59w to the upper edges of the side plates 59 and 59a of the lower box girder 58 of the girder structure, at 23, the adjacent ends of the arms 79 being constructed, as shown at 80 in Fig. 9, to receive the lower half 17a of the bearing 17.

As will be seen from Fig. 5, the corner portions of the F-shaped members 78 form parts of the supporting feet or brackets 27 for the terminal portions of the girder structure, at 23. The upper vertical plates 54, as well as the stiffening plates 55, are welded at 55w to the upper side of the arm 79, and it will be noted that the vertical plates 54 extend outwardly so as to reenforce such brackets or feet 27.

Each F-shaped member has an intermediate arm 82 having its lower face welded at 70w and 72w to the plates 70 and 72 and having its upper face welded at 71w and 73w to the plates 71 and 73 of the intermediate girder structure, at 24; and, outwardly of the terminal portions of the intermediate girder structure, at 24, the plates 71 and the F-shaped members provide supporting brackets or feet 28. The terminal portions 83 of the F-shaped members are welded at 83w to the cast steel cross member 31.

I have shown the F-shaped members 78 welded to the steel cross member 31 so as to be above the lower seating surface of the cross member, and, therefore, the supporting feet or brackets 27 and 28 are provided with pads 84 and 85, respectively, in order to provide coplanar supporting surfaces at each side of the gear housing.

Figure 4:
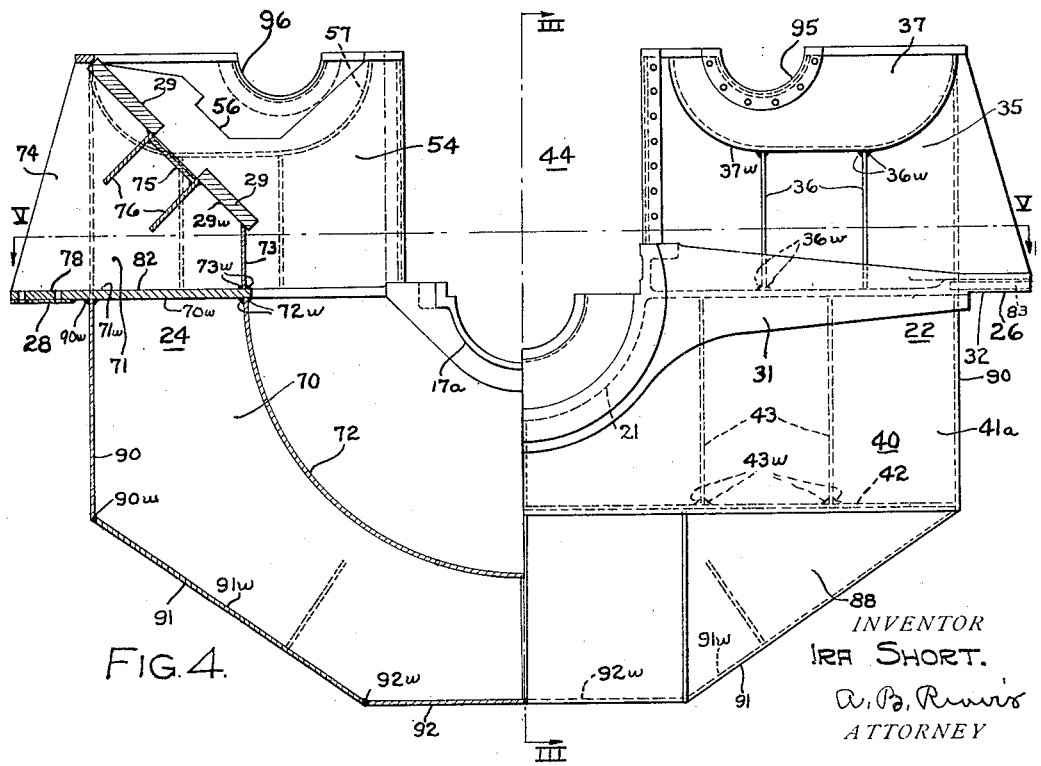
Fig. 4 is a sectional view taken along line IV—IV of Fig. 5.

So far, there has been described the essential forward, aft and intermediate girder structures for supporting the gear and pinion members, for resisting spreading of the pinions away from the gear, and for transmitting propeller thrust directly to the ship's structure without going through the housing. The girder structures cooperate with other structure to provide the enclosing housing for the gearing. To this end, end plates 88 are welded at 88w to the box girders 40 and 58 and are stiffened by gusset plates 89 welded at 89w to the plates 88 and to the bottoms of the box girders. The outer or vertical side plates 90 close the ends of the box girders 40 and 58 and are welded to the ends of the inner and outer plates thereof as well as to the under surfaces of the F plates 78 and the outer edges of the plates 91 at 90w. The outer or lower edge of the end plates 88 are shaped similarly to plates 70 of the intermediate girder structure, and the inclined and horizontal bottom plate elements 91 and 92 are welded thereto at 91w and 92w, the horizontal plate element having opposed edges welded to adjacent edges of the plates 91 at 92w (Fig. 4). The enclosure is completed above the cast steel cross member 31 and the F-shaped members 78 (Fig. 5), by the vertical plates 93 and 94 and by the cover 48. The plates 93 are welded at 93w at their lower edges to the inner edges of the F-shaped plates 78 and at their sides to the plates 54 and 71 of the aft and intermediate girder structures, at 23 and 24, respectively. In like manner, the vertical plates 94, aligned with the plates 93, are welded at 94w at their lower edges to the inner edges of the F-shaped members 78 and at their sides to the adjacent plates 71 and 35 of the forward and intermediate girder structures, at 22 and 24, respectively. As already pointed out, the upper plates 35 of the forward girder structure, at 22, and the upper plates 54 of the aft girder structure, at 23, are cut away to provide space for the extended ends of the floating frames 11; and, outwardly of these cut away spaces, there are connected to the plates 35, the forward housing 37 and to the plates 54, the aft housings 57. The upper edges of the plates 35, 94, 93, 54 and the upper edges of the forward and aft housings 37 and 57 are provided with the flange 51 welded thereto with which mates the flange 50 welded to the cover 48 and connected thereto by the bolts 53. Therefore, not only does the cover 48 serve to strengthen the upper portions of the end girder structures but it also serves to complete the enclosure.

The cover 48 is widened at the ends to provide upper, forward and aft portions 37a and 57a of the housings for the ends of the floating frames, and forward circular openings 95 and aft circular openings 96 are formed partly in the upper and lower parts 37 and 37a and 57 and 57a of the housing structures for the ends of the floating frames. In other words, the cover may be removed without disturbing any of the elements of the gearing, the only thing required being taking care of struts for the floating frames, hereinafter referred to. As shown, the prime mover drive shafts 97 enter through the forward openings 95.

As the pinions 10 mesh with the upper portion of the driven gear, the floating frames are arranged in an inclined manner, and this makes possible supporting the struts 98 by the cover 48, and backing up the floating frames and preventing the pinions from spreading away from the driven gear. The struts 98 engage suitable bearing sockets 99 on the floating frame and suitable adjustable sockets 100 carried by the screws 101, the latter being mounted in bosses 102 welded both to the cover 48 and interior webs 104, aligned with the plates 35 and 54, the welds being indicated at 102w in Figs. 15 and 16. As the boss 102 is at one side of the web 104, the latter is stiffened by transverse webs 105. Hence the cover 48 is reenforced to give adequate strength in the planes of the upper plates 35 and 54, that is, the cover 48 is connected to the casing structure as already pointed out and the location of the struts as nearly in line as possible with the plates 35 and 54 provides for a substantially direct tension connection between the bosses 102 and the bearings for the driven gear, whereby the bosses 102 and the bearings are tied together and spreading of the pinions away from the driven gear is prevented.

From the foregoing, it will be apparent that I have provided a built-up casing or housing construction for reduction gearing including end and intermediate girder structures which are constructed and arranged to carry all load and operating stresses. The forward end girder structure includes a cast steel cross member which carries a propeller thrust bearing so that propeller thrust is transmitted directly to the ship's structure without going through the gear housing. The intermediate girder structure is preferably of U-formation so that it may extend into the space between the toothed portions of the driven gear. The end girder structures are provided with U-shaped openings so that the driven gear bearings and the driven gear may be assembled or dismantled, the U-shaped openings being covered by suitable doors. The end girder structures have their upper portions reenforced by the cover which is connected to the upper portions of the end girder structures and the openings for the pinion connections are arranged partly in the cover and partly in the upper portions of the end girder structures. As the pinions engage the upper portion of the driven gear, their floating frames are arranged in an inclined manner and the struts for the floating frames are carried by the cover. Hence, with this arrangement, even though the pinions and the driven gear occupy different levels, the casing consists essentially of upper and lower parts, the lower part having U-shaped spaces to permit of the placing of the driven gear at a lower level. With this arrangement, not only does the cover serve to complete the enclosure and to reenforce the upper portions of the end beam structures but it also provides portions of the tension connections between the struts and the driven gear bearings. The plate elements of the transverse end and intermediate girder structures are so disposed as to provide adequate stiffness in the directions required. Obviously, the end girder structures must be stiff in a vertical direction to resist the static load imposed by the driven gearing and it will be noted that each of the girder structures includes a very considerable portion of the plate elements in vertical planes to give this stiffness, such plates being stiffened to prevent possible buckling by normal vertical plates. Also, the intermediate U-shaped girder structure is constructed and arranged to be stiff in a direction to prevent spreading of the terminal portions thereof, whereby such structure resists spreading of such portions away from the driven gear. While I show the pinions held in place both by the struts carried by the cover 48 and by the U-shaped girder structure, depending upon circumstances, one of these features alone may be sufficient for this purpose.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with supporting structure and a marine reduction gear embodying meshing pinion and gear members arranged in a fore-and-aft direction and the gear member being carried by a spindle directly connected to the propeller shaft, of means for retaining the pinion and gear members in meshing relation, said retaining means including a stress member which is relatively strong and stiff transversely of and in the plane of the gear member axis and connected to said supporting structure, and a thrust bearing carried by the stress member and cooperating with the gear member spindle for transmitting end thrust through the stress member to the supporting structure.

2. The combination with supporting structure and a marine reduction gear embodying meshing pinion and gear members arranged in a fore-and-aft direction and the gear member being carried by a spindle directly connected to the propeller shaft, of a casing structure for retaining the pinion and gear members in meshing relation and including a stress member which is relatively strong and stiff transversely of and in the plane of the gear member axis and having terminal feet connected to said supporting structure, and a thrust bearing carried by the cross member and cooperating with the spindle to transmit propeller thrust through the stress member directly to the supporting structure.

3. The combination with supporting structure and a marine reduction gear embodying meshing pinion and gear members arranged in a fore-and-aft direction and the gear member being carried by a spindle directly connected to the propeller shaft, of a casing structure for retaining the pinion and gear members in meshing relation and including a stress member which is relatively strong and stiff transversely of and in the plane of the gear member axis and having terminal feet connected to said supporting structure and the contact supporting surfaces of said feet being in the plane of the spindle axis, and a thrust bearing carried by the cross member and cooperating with the spindle to transmit propeller thrust through the stress member directly to the supporting structure.

4. In a marine reduction gear, the combination of meshing pinion and gear members, a spindle for the gear member, a housing construction supporting and enclosing the pinion and gear members and including a transversely-extending stress member forming a part of one end wall of the housing and having terminal feet for attachment to ship's structure, and a thrust bearing for transmitting thrust from the spindle through the transversely-extending stress member to said structure.

5. In a reduction gear, meshing pinion and gear members, a spindle for the gear member, means for supporting the pinion and gear members in meshing relation including end girders provided with bearings for supporting the gear member and having terminal supporting feet for attachment to supporting structure, one of said end girders including a cross member carrying one of said bearings and terminating in supporting feet for attachment to supporting structure, said cross member being strong and stiff in the direction of the gear member axis, and a thrust bearing for transmitting thrust from the spindle through the cross member to the supporting structure.

6. In a reduction gear, meshing pinion and gear members, a spindle for the gear member, means for supporting the pinion and gear members in meshing relation including a cross member which is relatively strong and stiff in the direction of the gear member axis, said cross member having terminal feet for attachment to supporting structure and the terminal feet having the contact surfaces thereof arranged substantially in the plane of the gear member axis, and a thrust bearing for transmitting thrust from the spindle through the cross member to said supporting structure.

7. In a reduction gear, meshing pinion and gear members, a spindle for the gear member, a housing carrying the pinion and gear members, supporting feet at either side of the housing for attachment to supporting structure, said housing including a horizontal cross member at one end and terminating in a pair of said supporting feet, and a thrust bearing for transmitting thrust from the gear member spindle to the cross member.

8. In a marine reduction gear, meshing pinion and gear members, a spindle for the gear member, a housing carrying the pinion and gear members, supporting feet provided at either side of the housing for attachment to ship's structure, said housing embodying a cross member at one end terminating in a pair of said supporting feet and the contact surfaces of the latter being arranged substantially in the plane of the gear member axis and said cross member being relatively strong and stiff in said plane, and a thrust bearing for transmitting thrust from the gear member spindle to the cross member.

9. In a reduction gear, meshing pinion and gear members, a spindle for the gear member, means for supporting the pinion and gear members in meshing relation including a pair of end girders having journal bearings for supporting the gear member spindle and provided with terminal feet for attachment to supporting structure, each of said girders embodying a built-up box girder arranged below its bearing with compression structure arranged above the latter and one of the girders embodying a steel cross member providing its supporting feet with its box girder welded thereto below and with its compression structure connected thereto above, said cross member being widened in the direction of the gear member axis so as to be strong and stiff in the plane of the gear member axis, said cross member carrying one of said bearings, and a thrust bearing for transmitting thrust from the gear member spindle to the cross member.

10. In a reduction gear, meshing pinion and gear members; a spindle for the gear member; means for supporting the pinion and gear members in meshing relation including first and second spaced cross girder structures provided, respectively, with first and second bearings for said spindle and having terminal supporting feet for attachment to supporting structure; the first girder structure embodying a cross member carrying the first bearing and which is strong and stiff in the direction of the gear member axis, a box girder including vertical plates having their upper edges welded to the lower surfaces of the cross member, plates extending above the cross member at either side of the first bearing and having their lower edges welded to the upper surface of the cross member, and detachable compression means for connecting the upper edges of the plates; the second girder structure embodying horizontal plate members having transverse arms extending inwardly toward the second bearing and longitudinal arms extending toward and welded to said cross member, a box girder supporting the second bearing and including vertical plates welded at their upper edges to the bottom surfaces of said transverse arms, vertical plates extending above the transverse arms at either side of the second bearing and having their lower edges welded to the upper surfaces of the transverse arms, and detachable compression means for connecting the upper edges of the plates; and a thrust bearing between said cross member and the gear spindle for transmitting thrust from the latter through the cross member to supporting structure.

11. In a reduction gear, a housing including upper and lower parts and means for connecting the parts together, meshing pinion and gear members, bearings provided on the lower part for supporting the gear member, a floating frame carried by the lower part for supporting the pinion member, and strut means carried by the upper housing part and cooperating with the floating frame to prevent movement of the pinion member away from the gear member.

12. In a reduction gear, a driven gear, a pinion arranged at a higher level than the gear and meshing with the latter, upper and lower housing parts connected together substantially at the horizontal plane of the pinion axis, bearings for the driven gear carried by the lower housing part, a floating frame carrying the pinion and mounted on the lower housing part, and strut means carried by the upper housing part and cooperating with the frame to prevent movement of the pinion away from the gear.

13. In a reduction gear, a driven gear, a pinion arranged at a higher level than the gear and meshing with the latter, upper and lower housing parts connected together substantially at the horizontal plane of the pinion axis, bearings for the driven gear carried by the lower housing part, a floating frame carrying the pinion and providing for angular motion thereof about an axis normal both to the gear and pinion axes, and strut means carried by the upper housing part and cooperating with the frame to confine movement thereof about said axis.

14. In a reduction gear, a driven gear, a pinion arranged at a higher level than the gear and meshing with the latter; upper and lower housing parts connected together substantially at the horizontal plane of the pinion axis; bearings for the driven gear carried by the end walls of the lower housing part; a floating frame carrying the pinion and providing for angular motion thereof about an axis normal both to the gear and pinion axes; and a pair of struts carried by the upper housing part, substantially aligned with said end walls, and cooperating with end portions of the frame to confine movement thereof about said normal axis.

15. In a reduction gear, a driven gear, a pinion arranged at a higher level than the gear and meshing with the latter, upper and lower housing parts connected together substantially at the horizontal plane of the pinion axis, said lower housing part having U-shaped openings in the end walls thereof opening through the top edges of lower part, bearings for the driven gear arranged at the bottoms of said openings and carried by the lower housing part, detachable doors arranged above the bearings and connected to the side edges of said openings and to the upper housing part, a floating frame mounted on the lower housing part and carrying the pinion, said floating frame providing for angular motion of the pinion about an axis normal both to the gear and pinion axes, and struts carried by the upper housing part and cooperating with the frame to confine movement thereof about said normal axis, said struts being arranged substantially in alignment with the end walls of said lower housing part provided with said U-shaped openings.

16. In marine reduction gearing, the combination of spaced side supports forming a part of ship's structure and extending in a fore-and-aft direction, girder members spanning the space between the side supports and each having terminal feet resting on the latter, means for securing the terminal feet to the side supports, meshing pinion and gear members having their axes extending in a fore-and-aft direction, bearings carried by the girder members for supporting the pinion and gear members in meshing relation, and a thrust bearing carried by one of the girder members and cooperating with the gear member to resist propeller thrust, each of said girder members serving to transmit load imposed thereon directly to the side supports and independently of the other girder members.

17. In marine reduction gearing, the combination of spaced side supports forming a part of ship's structure and extending in a fore-and-aft direction, girder members spanning the space between the side supports and each having terminal feet resting on the latter, means for securing the terminal feet to the side supports, meshing pinion and gear members having their axes extending in a fore-and-aft direction, bearings carried by the girder members for supporting the pinion and gear members in meshing relation, a thrust bearing carried by one of the girder members and cooperating with the gear member to resist propeller thrust, and plate material forming a relatively light enclosure for the pinion and gear members and connected to and carried by the girder members, each of said girder members serving to transmit load imposed thereon directly to the side supports and independently of the other girder members.

18. In marine reduction gearing, the combination of spaced side supports forming a part of ship's structure and extending in a fore-and-aft direction, girder members including end girder members spanning the space between the side supports and each having terminal feet resting on the latter, means for securing the terminal feet to the side supports, meshing pinion and gear members having their axes extending in a fore-and-aft direction, bearings carried by the girder members for supporting the pinion and gear members in meshing relation and including bearings carried by the end girder members for supporting the gear member, a thrust bearing carried by one of the end girder members and cooperating with the gear member to resist propeller thrust, said end girder members having U-shaped spaces opening through the top sides thereof with the gear member bearings supported at the bottoms of the spaces, and structure connected to the end girder members and spanning the U-shaped spaces to give compressive strength to the upper sides of the end girder members, each of said girder members serving to transmit load imposed thereon directly to the side supports and independently of the other girder members.

19. In marine reduction gearing, the combination of spaced side supports forming a part of ship's structure and extending in a fore-and-aft direction, end and intermediate girder members spanning the space between the side supports and each having terminal feet resting on the latter, means for securing the terminal feet to the side supports, meshing pinion and gear members having their axes extending in a fore-and-aft direction, bearings carried by the end girder members for supporting the gear member, said intermediate girder member being of upright, U-shaped formation and extending underneath the gear member, and bearings carried by the upper portions of the legs of the U-shaped girder member for supporting the pinion members, each of said girder members serving to transmit load imposed thereon directly to the side supports and independently of the other girder members.

In testimony whereof, I have hereunto subscribed my name this 31st day of July, 1931.

IRA SHORT.